United States Patent [19]
Sun

[11] Patent Number: 5,331,764
[45] Date of Patent: Jul. 26, 1994

[54] RACK FOR GROWING PLANTS

[76] Inventor: Han C. Sun, 43, Ta An Road, Tieng Chung Shen, Changhua, Taiwan

[21] Appl. No.: 51,340

[22] Filed: Apr. 22, 1993

[51] Int. Cl.⁵ .............................................. A01G 17/06
[52] U.S. Cl. ........................................ 47/45; 248/156; 248/436
[58] Field of Search ................. 47/45 C; 248/436, 156

[56] References Cited

U.S. PATENT DOCUMENTS

| | | | |
|---|---|---|---|
| 610,803 | 9/1898 | Elliott | 47/45 C |
| 963,030 | 7/1910 | Balch | 47/45 C |
| 1,104,083 | 7/1914 | Stone | 248/436 |
| 1,361,464 | 12/1920 | Hunt | 47/45 C |

*Primary Examiner*—Henry E. Raduazo
*Attorney, Agent, or Firm*—Merchant, Gould, Smith, Edell, Welter & Schmidt

[57] ABSTRACT

A rack for growing plants including a collapsible open frame having wire holes, through which a cord is inserted to set up a netting stretched in the collapsible open frame, and upright supports to support the collapsible open frame, each upright support having a forked top end terminated to a downward hook hooked in a hole on either corner on the collapsible open frame and an upward angle bar to support the collapsible open frame at either corner.

1 Claim, 2 Drawing Sheets

RACK FOR GROWING PLANTS

BACKGROUND OF THE INVENTION

1. Field of the Invention

The present invention relates to a rack for growing plants which can be conveniently set up to hold a netting for growing plants, and which can be collapsed to reduce its space occupation when not in use.

2. Description of Prior art

In plant culturing, a stick or pole may be used for growing plants. However, a plant may be blown down by the wind if it is simply supported on a stick or pole. There are disclosed a variety of bamboo, wooden or metal racks for growing plants. These racks may use different loops or wire nettings for the climbing of the plants or for the suspension of the fruits. However, these racks are commonly not collapsible. Once they are set up, the can not be dismantled and moved from place to place. Further, because the loops and wire nettings are commonly made of metal wires, they may hinder or oppress the growing of plants.

SUMMARY OF THE INVENTION

The present invention eliminates the aforesaid drawbacks. It is therefore an object of the present invention to provide a rack for growing plants which can be conveniently and stably set up for growing plants. It is another object of the present invention to provide a rack for growing plants which can be collapsed for delivery when not in use. It is still another object of the present invention to provide a rack for growing plants which does not hinder the growing of the plants.

According to the preferred embodiment of the present invention, the rack is comprised of a collapsible open frame supported on upright supports, and a netting stretched in the collapsible open frame. Because the netting is formed by threading a cord through wire holes on the collapsible open frame, it is flexible for supporting plants tenderly. The collapsible open frame is fastened to the upright supports through hooked joints, and therefore it can be conveniently detached from the upright supports and then collapsed to reduce the space occupation.

BRIEF DESCRIPTION OF THE DRAWINGS

The foregoing and other objects, features and advantages of the present invention will be best understood from the following description, the appended claims and the accompanying drawings in which:

DETAILED DESCRIPTION OF THE PREFERRED EMBODIMENT

Figure 1:
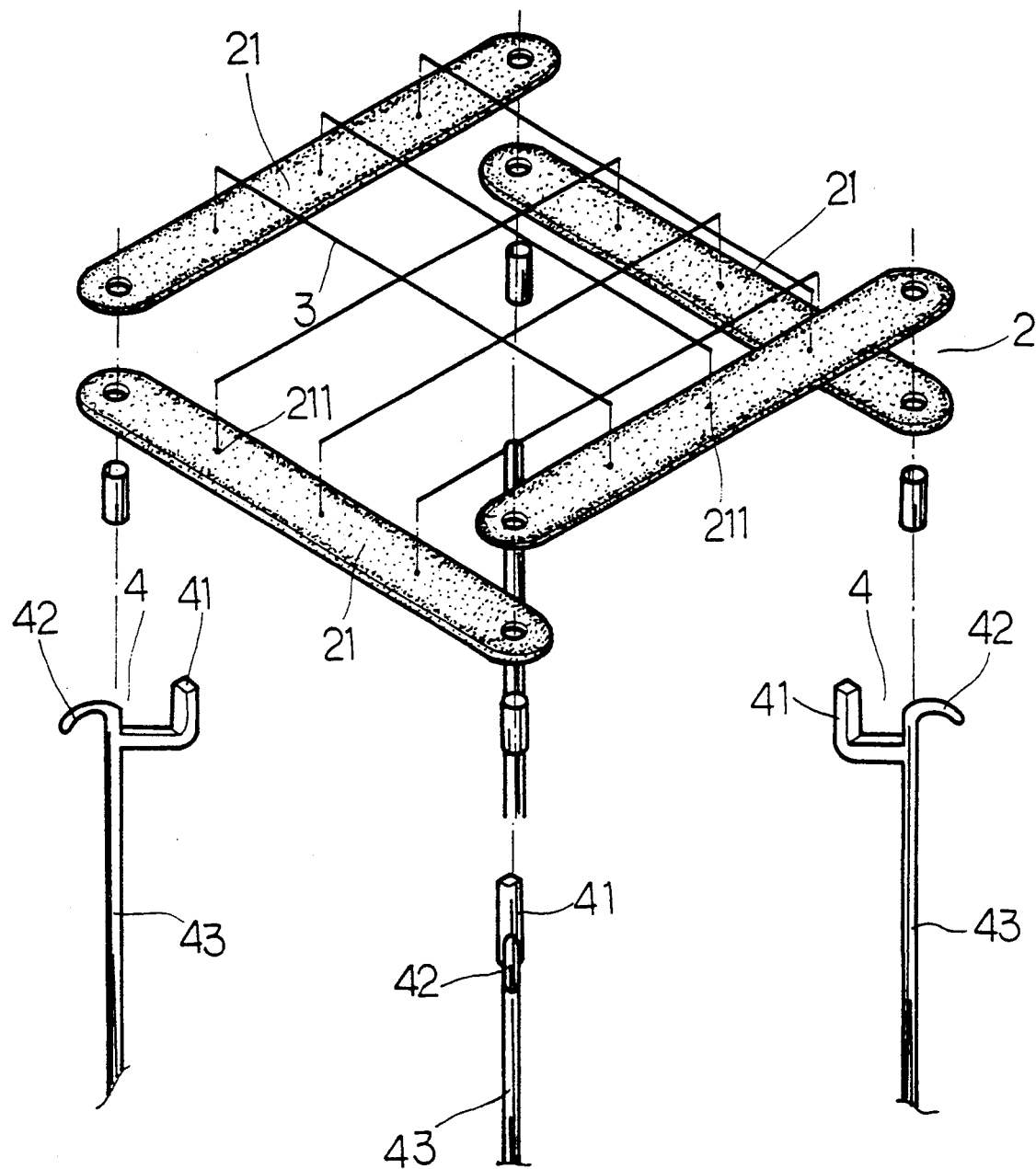
FIG. 1 is a perspective exploded view of a rack according to the present invention.
Figure 2:
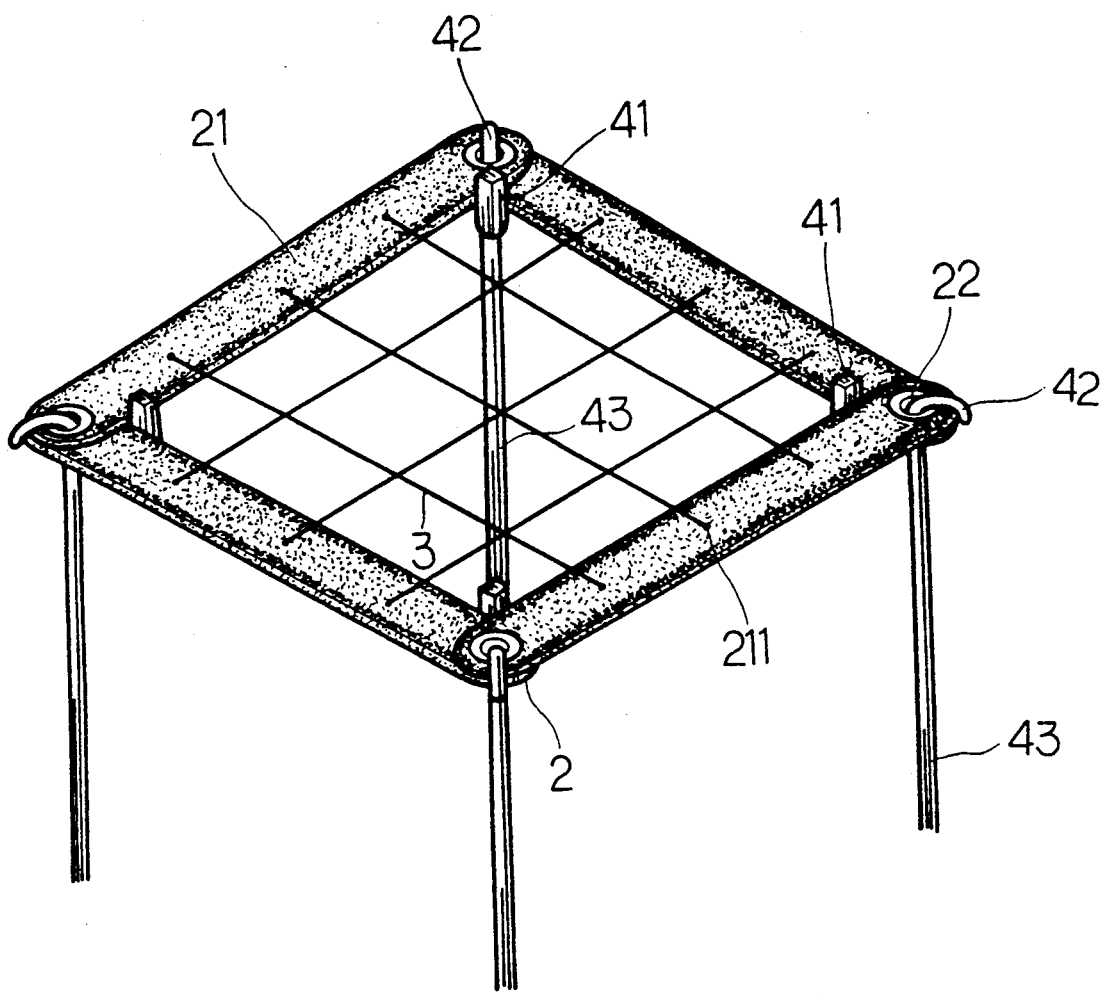
FIG. 2 is a perspective assembly view thereof.

Referring to FIGS. 1 and 2, a rack for growing plants as constructed in accordance with the present invention is generally comprised of a collapsible open frame 2 supported on upright supports 4, and a netting 3 stretched in the collapsible open frame 2.

Referring to FIG. 1 again, the collapsible opening frame 2 is comprised of a plurality of rods 21 having each two opposite ends respectively pivoted to one another by hollow pivots 22. Wire holes 211 are made on the rods 21 for inserting a cord in setting up the aforesaid netting 3. Each upright support 4 is comprised of an elongated upright rod 43 having a forked top end terminated to a downward hook 42 and an upward angle bar 41.

Referring to FIGS. 1 and 2 again, by hooking the downward hook 42 into either hollow pivot 22 for permitting the respective rod 21 to be supported on the upward angle bar 41, the collapsible open frame 2 is fastened to and supported on the upright supports 4. By disengaging the downward hook 42 from the respective hollow pivot 22, the collapsible open frame 2 is detached from the upright supports 4.

Figure 2A:
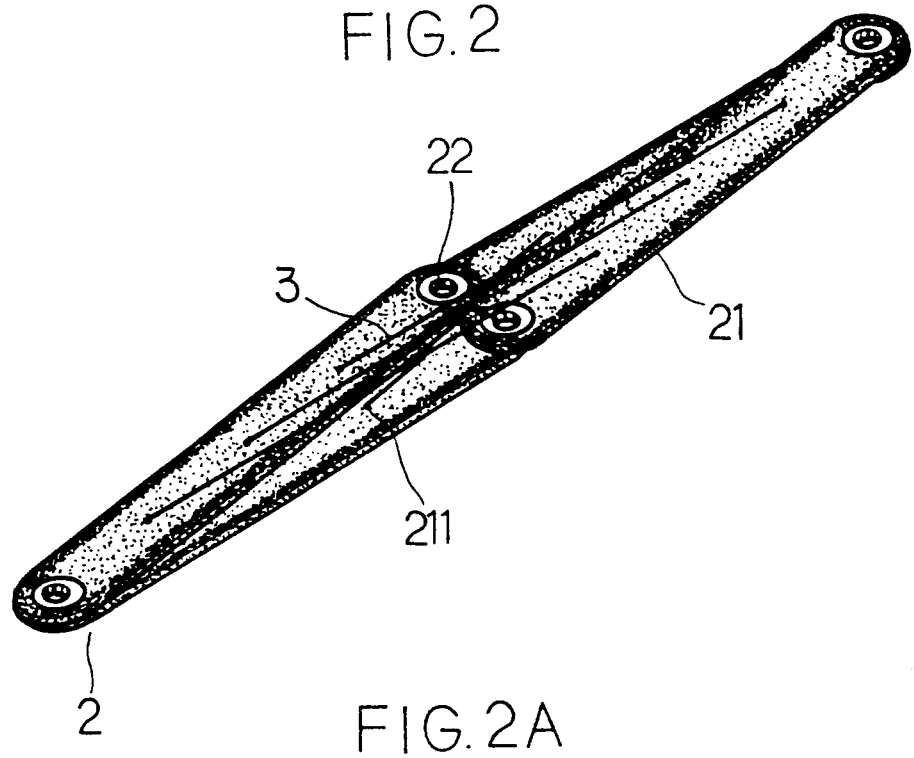
FIG. 2A illustrates the top frame collapsed.

Referring to FIG. 2A, after having been detached from the upright supports 4, the collapsible open frame 2 with the netting 3 can be collapsed to reduce its space occupation when not in use.

What is claimed is:

1. A rack for growing plants comprising a collapsible open frame supported on upright supports, and a netting stretched in said collapsible open frame, said collapsible open frame being comprised of a plurality of rods having each two opposite ends respectively and pivotally connected to one another by hollow pivots, each rod having wire holes for inserting a cord in setting up said netting, each upright support comprising an elongated upright rod having a forked top end terminated to a downward hook hooked in either hollow pivot and an upward angle bar to support either rod.

* * * * *